United States Patent
Nakado et al.

(10) Patent No.: US 12,533,928 B2
(45) Date of Patent: Jan. 27, 2026

(54) HEAT EXCHANGER AND AIR CONDITIONER FOR VEHICLE

(71) Applicant: MITSUBISHI HEAVY INDUSTRIES THERMAL SYSTEMS, LTD., Tokyo (JP)

(72) Inventors: Koji Nakado, Tokyo (JP); Nobuya Nakagawa, Tokyo (JP); Hideaki Tatenoi, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 270 days.

(21) Appl. No.: 18/027,879

(22) PCT Filed: Sep. 29, 2021

(86) PCT No.: PCT/JP2021/035786
§ 371 (c)(1),
(2) Date: Mar. 22, 2023

(87) PCT Pub. No.: WO2022/071368
PCT Pub. Date: Apr. 7, 2022

(65) Prior Publication Data
US 2023/0364966 A1 Nov. 16, 2023

(30) Foreign Application Priority Data
Sep. 30, 2020 (JP) .................. 2020-165026

(51) Int. Cl.
*B60H 1/00* (2006.01)
*B60H 1/32* (2006.01)
(Continued)

(52) U.S. Cl.
CPC ..... *B60H 1/00328* (2013.01); *B60H 1/00907* (2013.01); *B60H 1/3228* (2019.05);
(Continued)

(58) Field of Classification Search
CPC .............. B60H 1/00328; B60H 1/3228; B60H 1/00907; F25B 39/02; F25B 43/00;
(Continued)

(56) References Cited

U.S. PATENT DOCUMENTS

2011/0259551 A1  10/2011  Kasai et al.
2012/0266624 A1  10/2012  Inaba et al.
(Continued)

FOREIGN PATENT DOCUMENTS

CN         105258411 A  *  1/2016
DE   11 2016 003 745 T5    4/2018
(Continued)

OTHER PUBLICATIONS

Fukaya et al., Heat Exchanger, Dec. 6, 2018, JP2018194251A, Whole Document (Year: 2018).*
(Continued)

*Primary Examiner* — Larry L Furdge
(74) *Attorney, Agent, or Firm* — Birch, Stewart, Kolasch & Birch, LLP (57) ABSTRACT

This heat exchanger is equipped with: a first heat exchange unit having a first inlet/outlet unit which has one inlet/outlet port and through which a coolant flows, and also having a plurality of first heat transfer pipes, each of which has one end thereof connected to the first inlet/outlet unit; a header pipe which is connected to the other ends of the plurality of first heat transfer pipes; and a second heat exchange unit (Continued)

having a second inlet/outlet unit which has two or more inlet/outlet ports and through which a coolant flows, and also having a plurality of second heat transfer pipes, each of which has one end thereof connected to the header pipe and the other end thereof connected to the second inlet/outlet unit.

8 Claims, 5 Drawing Sheets

(51) Int. Cl.
| | |
|---|---|
| *F25B 39/02* | (2006.01) |
| *F25B 39/04* | (2006.01) |
| *F25B 43/00* | (2006.01) |
| *F28D 1/04* | (2006.01) |
| *F28D 1/053* | (2006.01) |
| *F28F 9/02* | (2006.01) |
| *F25B 5/02* | (2006.01) |
| *F25B 6/04* | (2006.01) |
| *F25B 41/39* | (2021.01) |
| *F28D 21/00* | (2006.01) |

(52) U.S. Cl.
CPC ............. *F25B 39/02* (2013.01); *F25B 39/04* (2013.01); *F25B 43/00* (2013.01); *F28D 1/0417* (2013.01); *F28D 1/05325* (2013.01); *F28F 9/0209* (2013.01); *F28F 9/0246* (2013.01); *F28F 9/027* (2013.01); *F25B 5/02* (2013.01); *F25B 6/04* (2013.01); *F25B 41/39* (2021.01); *F25B 2400/13* (2013.01); *F25B 2400/23* (2013.01); *F25B 2500/18* (2013.01); *F28D 2021/0084* (2013.01); *F28D 2021/0085* (2013.01)

(58) Field of Classification Search
CPC .... F25B 41/39; F25B 5/02; F25B 6/04; F25B 2400/13; F25B 2400/23; F25B 2500/18; F28D 1/0417; F28D 1/05325; F28D 2021/0084; F28D 2021/0085; F28F 9/0209; F28F 9/027
See application file for complete search history.

(56) References Cited

U.S. PATENT DOCUMENTS

| | | | |
|---|---|---|---|
| 2018/0178632 A1* | 6/2018 | Saito | ........................ F25B 43/00 |
| 2021/0252943 A1 | 8/2021 | Nakagawa et al. | |

FOREIGN PATENT DOCUMENTS

| | | |
|---|---|---|
| JP | 2002-130866 A | 5/2002 |
| JP | 2012-233676 A | 11/2012 |
| JP | 2013-15289 A | 1/2013 |
| JP | 2014-222143 A | 11/2014 |
| JP | 2018-194251 A | 12/2018 |
| JP | 2020-15414 A | 1/2020 |
| WO | WO 2018/173356 A1 | 9/2018 |

OTHER PUBLICATIONS

Xia et al., Gas-Liquid Separating Pipe for Heat Exchanger and Heat Exchanger, Jan. 20, 2016, Whole Document (Year: 2016).*
International Search Report for International Application No. PCT/JP2021/035786, dated Nov. 16, 2021, with English translation.
Written Opinion of the International Searching Authority for International Application No. PCT/JP2021/035786, dated Nov. 16, 2021, with English translation.

* cited by examiner

HEAT EXCHANGER AND AIR CONDITIONER FOR VEHICLE

TECHNICAL FIELD

The present disclosure relates to a heat exchanger and an air conditioner for a vehicle. This application claims the right of priority based on Japanese Patent Application No. 2020-165026 filed with the Japan Patent Office on Sep. 30, 2020, the content of which is incorporated herein by reference.

BACKGROUND ART

As an example of an air conditioner for a vehicle, a device described in PTL 1 below is known. The device according to PTL 1 mainly includes a compressor, an inner condenser, an outer heat exchanger, an evaporator, and a plurality of decompression means. Among these, the outer heat exchanger functions as an evaporator that evaporates a low-pressure refrigerant to exhibit endothermic action in a heating operation mode, and functions as a radiator that radiates heat from a high-pressure refrigerant in a cooling operation mode. Further, in this outer heat exchanger, a refrigerant always flows in and out from the same inlet and outlet regardless of whether it is in the heating operation mode or the cooling operation mode.

CITATION LIST

Patent Literature

[PTL 1] Japanese Unexamined Patent Application Publication No. 2012-233676

SUMMARY OF INVENTION

Technical Problem

However, in a case where a flow direction of the refrigerant in the outer heat exchanger does not always change as described above, there is a concern that the efficiency may not be optimized in both the cooling operation mode and the heating operation mode. Here, a heat exchanger is considered which has different numbers of heat transfer pipes on an inlet side and an outlet side, and in which these heat transfer pipes are connected to each other by a single header pipe. In this case, for example, in order to maximize the efficiency in the cooling operation mode, due to the characteristics of the refrigerant, it is desirable to increase the number of heat transfer pipes (the number of passes) on the inlet side of the heat exchanger and to reduce the number of passes on the outlet side. On the other hand, in order to maximize the efficiency in the heating operation mode, it is desirable to reduce the number of passes on the inlet side and to increase the number of passes on the outlet side. In this manner, the configuration of an optimal heat exchanger conflicts between the different operation modes, and therefore, there is a concern that the improvement of the efficiency of the heat exchanger may be hindered.

The present disclosure has been made to solve the above problems and has an object to provide a heat exchanger and an air conditioner for a vehicle, in which heat exchange efficiency is further improved regardless of an operating state.

Solution to Problem

In order to solve the above problems, a heat exchanger according to the present disclosure includes: a first heat exchange unit that includes a first inlet/outlet part which has one inlet/outlet port and through which a refrigerant flows, and a plurality of first heat transfer pipes, each of which has one end connected to the first inlet/outlet part; a header pipe connected to the other ends of the plurality of first heat transfer pipes; and a second heat exchange unit that includes a second inlet/outlet part which has two or more inlet/outlet ports and through which a refrigerant flows, and a plurality of second heat transfer pipes, each of which has one end connected to the header pipe and the other end connected to the second inlet/outlet part, in which the refrigerant flows from a first heat exchange unit side toward a second heat exchange unit side during heating, the refrigerant flows from the second heat exchange unit side toward the first heat exchange unit side during cooling, and a heat exchange area, which is an area available for heat exchange between the refrigerant and air, is larger in the second heat exchange unit than in the first heat exchange unit.

A heat exchanger according to the present disclosure includes: a first heat exchange unit that includes a first inlet/outlet part which has one inlet/outlet port and through which a refrigerant flows, and a plurality of first heat transfer pipes, each of which has one end connected to the first inlet/outlet part; a header pipe connected to the other ends of the plurality of first heat transfer pipes; and a second heat exchange unit that includes a second inlet/outlet part which has two or more inlet/outlet ports and through which a refrigerant flows, and a plurality of second heat transfer pipes, each of which has one end connected to the header pipe and the other end connected to the second inlet/outlet part, in which the refrigerant flows from a first heat exchange unit side toward a second heat exchange unit side during heating, the refrigerant flows from the second heat exchange unit side toward the first heat exchange unit side during cooling, and a sum of flow path cross-sectional areas of the second heat transfer pipes in the second heat exchange unit is larger than a sum of flow path cross-sectional areas of the first heat transfer pipes in the first heat exchange unit.

Advantageous Effects of Invention

According to the present disclosure, it is possible to provide a heat exchanger and an air conditioner for a vehicle, in which the heat exchange efficiency is further improved regardless of the operating state.

DESCRIPTION OF EMBODIMENTS (Configuration of Air Conditioner for Vehicle)

Hereinafter, an air conditioner for a vehicle and a heat exchanger according to an embodiment of the present disclosure will be described with reference to FIGS. 1 to 5.

The air conditioner for a vehicle of the present embodiment is mounted on an electric vehicle (EV), a hybrid electric vehicle (HEV), a plug-in hybrid electric vehicle (PHEV), or the like.

Figure 1:
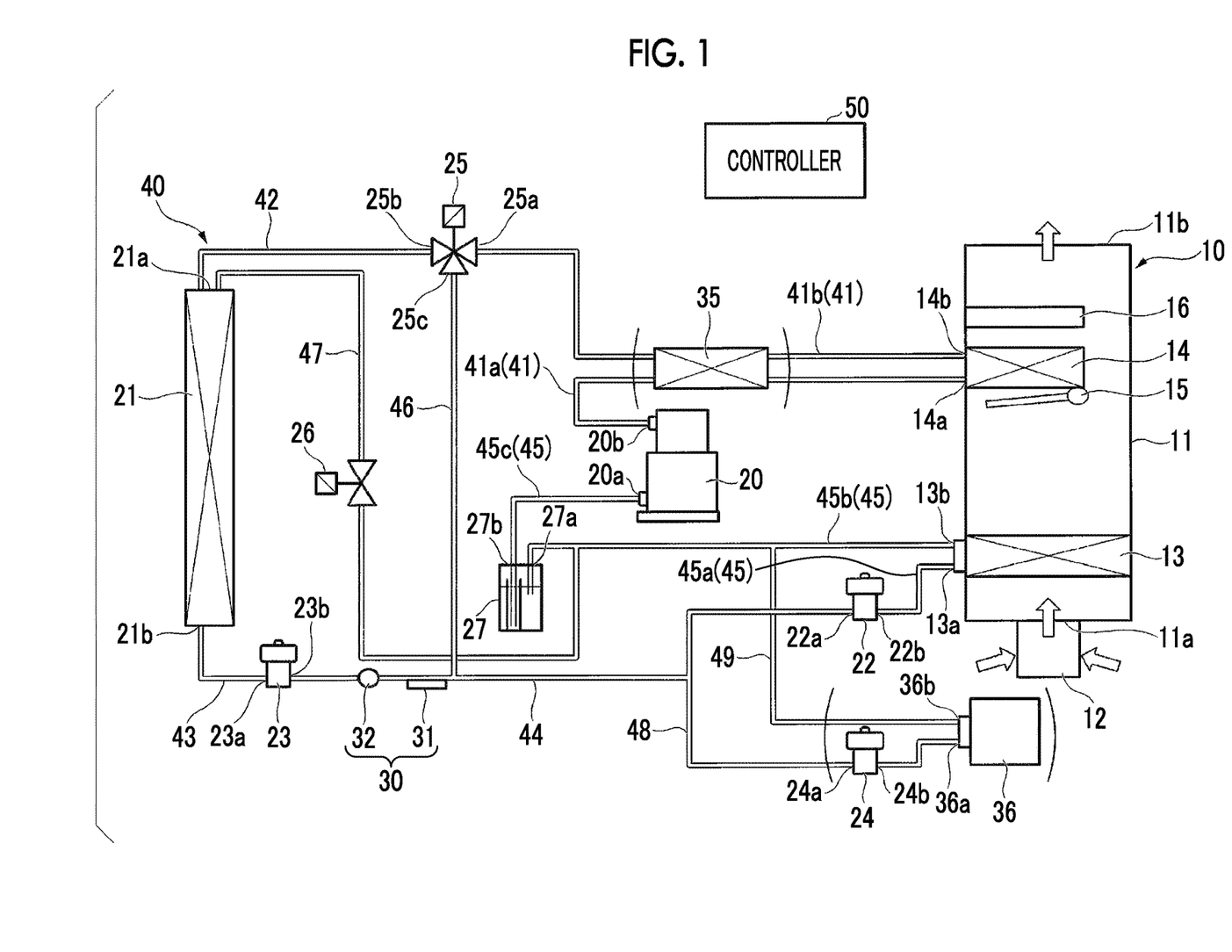
FIG. 1 is a system diagram showing a configuration of an air conditioner for a vehicle according to an embodiment of the present disclosure.

As shown in FIG. 1, the air conditioner for a vehicle includes an HVAC (Heating Ventilation and Air Conditioning) unit 10, a compressor 20, an outer heat exchanger 21 (a heat exchanger), a first expansion valve 22, a second expansion valve 23, a three-way valve 25, a two-way valve 26, a buffer tank 27, a refrigerant line 40 connecting these components, an expansion valve control detector 30, and a controller 50.

(Configuration of HVAC Unit)

The HVAC unit 10 includes a unit duct 11, a blower 12, an evaporator 13, an inner condenser 14, an air mix damper 15, and an auxiliary heater 16.

The unit duct 11 is disposed in an instrument panel of a vehicle. The unit duct 11 has an air inlet 11a and an air outlet 11b. The blower 12 selectively sucks one of outside air and indoor air and sends the air as indoor air from the air inlet 11a of the unit duct 11 into the unit duct 11. The evaporator 13 is disposed in the unit duct 11. The evaporator 13 has an inlet 13a through which a refrigerant flows in, and an outlet 13b through which the refrigerant flows out. The evaporator 13 performs the heat exchange between the indoor air from the blower 12 and the refrigerant to heat and evaporate the refrigerant while cooling the indoor air. The inner condenser 14 is disposed at a position closer to the air outlet 11b than the evaporator 13 in the unit duct 11. The inner condenser 14 has an inlet 14a through which the refrigerant flows in, and an outlet 14b through which the refrigerant flows out. The inner condenser 14 performs heat exchange between the indoor air from the blower 12 and the refrigerant to cool and condense the refrigerant while heating the indoor air. The air mix damper 15 is disposed along the inner condenser 14 between the evaporator 13 and the inner condenser 14 in the unit duct 11. The air mix damper 15 adjusts the amount of air that passes through the inner condenser 14, of air that has flowed into the unit duct 11, and the amount of air that bypasses the inner condenser 14 without passing through it, of the air that has flowed into the unit duct 11, according to an instruction from the controller 50. The auxiliary heater 16 is disposed closer to the air outlet 11b side than the inner condenser 14 is, in the unit duct 11. In a case where even if air is heated by the inner condenser 14, the temperature of the air does not rise to a target temperature, the auxiliary heater 16 heats the air according to an instruction from the controller 50. The air outlet 11b of the unit duct 11 is connected to a vent provided in the instrument panel or the like.

(Configuration of Compressor)

The compressor 20 has a suction port 20a for sucking in the refrigerant, and a discharge port 20b for discharging the refrigerant. The compressor 20 compresses the refrigerant sucked in through the suction port 20a and discharges it through the discharge port 20b. The compressor 20 can change a rotation speed, which is a driving amount, according to an instruction from the controller 50.

(Outline of Outer Heat Exchanger)

The outer heat exchanger 21 has a first port 21a and a second port 21b through which the refrigerant enters and exits. The outer heat exchanger 21 performs the heat exchange between the refrigerant and the outside air. The configuration of the outer heat exchanger 21 will be described later.

(Configurations of First Expansion Valve, Second Expansion Valve, Three-Way Valve, and Two-Way Valve)

Each of the first expansion valve 22 and the second expansion valve 23 is an electromagnetic valve. Each of these expansion valves has a valve case, a valve body disposed in the valve case, and an electromagnetic drive mechanism for moving the valve body in the valve case to change a valve opening degree. The valve case has first ports 22a and 23a and second ports 22b and 23b through which the refrigerant enters and exits.

Each of the three-way valve 25 and the two-way valve 26 is an electromagnetic valve. The three-way valve 25 has a valve case, a valve body disposed in the valve case, and an electromagnetic drive mechanism for moving the valve body in the valve case. The valve case has an inlet 25a through which the refrigerant flows in, and a first outlet 25b and a second outlet 25c through which the refrigerant flows out. The valve body can be displaced to a cooling state where the inlet 25a and the first outlet 25b communicate with each other and to a heating state where the inlet 25a and the second outlet 25c communicate with each other. The electromagnetic drive mechanism displaces the valve body to the heating state or to the cooling state according to an instruction from the controller 50.

The buffer tank 27 is a tank for temporarily storing the refrigerant.

(Configuration of Expansion Valve Control Detector)

The expansion valve control detector 30 is provided in the refrigerant line 40 and detects the state quantity of the refrigerant in the refrigerant line 40. The expansion valve control detector 30 is composed of only one set of detectors having one temperature sensor 31 for detecting the temperature of the refrigerant and one pressure sensor 32 for detecting the pressure of the refrigerant. Both the temperature sensor 31 and the pressure sensor 32 are provided in the refrigerant line 40.

(Configuration of Refrigerant Line)

The refrigerant line 40 includes a discharge line 41, a heat exchanger first port line 42, a heat exchanger second port line 43, an inter-expansion valve line 44, a suction line 45, a first heating dedicated line 46, and a second heating dedicated line 47.

The discharge line 41 connects the discharge port 20b of the compressor 20 and the inlet 25a of the three-way valve 25. The discharge line 41 has a first discharge line 41a and a second discharge line 41b. The first discharge line 41a connects the discharge port 20b of the compressor 20 and the inlet 14a of the inner condenser 14. The second discharge line 41b connects the outlet 14b of the inner condenser 14 and the inlet 25a of the three-way valve 25. Accordingly, the inner condenser 14 is provided in the discharge line 41.

The heat exchanger first port line 42 connects the first outlet 25b of the three-way valve 25 and the first port 21a of the outer heat exchanger 21. The heat exchanger second port line 43 connects the second port 21b of the outer heat exchanger 21 and the first port 23a of the second expansion valve 23. The inter-expansion valve line 44 connects the second port 23b of the second expansion valve 23 and the first port 22a of the first expansion valve 22.

The suction line 45 connects the second port 22b of the first expansion valve 22 and the suction port 20a of the compressor 20. The suction line 45 has a first suction line 45a, a second suction line 45b, and a third suction line 45c.

The first suction line 45a connects the second port 22b of the first expansion valve 22 and the inlet 13a of the evaporator 13. The second suction line 45b connects the outlet 13b of the evaporator 13 and an inlet 27a of the buffer tank 27. The third suction line 45c connects an outlet 27b of the buffer tank 27 and the suction port 20a of the compressor 20. Accordingly, the evaporator 13 and the buffer tank 27 are provided in the suction line 45.

The first heating dedicated line 46 connects the second outlet 25c of the three-way valve 25 and the inter-expansion valve line 44. The second heating dedicated line 47 connects the first port 21a of the outer heat exchanger 21 and the second suction line 45b. The first heating dedicated line 46 is directly connected to the inter-expansion valve line 44 without the intervention of equipment including a valve, and configures an inter-expansion valve connection line in which a liquid-phase refrigerant is present during both heating and cooling.

The two-way valve 26 is provided in the second heating dedicated line 47. The expansion valve control detector 30 is provided between the second port 23b of the second expansion valve 23 and the connection position with the first heating dedicated line 46 in the inter-expansion valve line 44 and detects the state quantity of the refrigerant between them.

(Configuration of Controller)

The controller 50 receives a mode from a vehicle occupant or the like and controls the compressor 20, the three-way valve 25, the two-way valve 26, the first expansion valve 22, the second expansion valve 23, the blower 12, the air mix damper 15, and the auxiliary heater 16 according to the received mode. Here, as the mode that the controller 50 receives, there are a heating mode and a cooling mode.

Next, the operation of the air conditioner for a vehicle described above will be described.

First, the operation of the air conditioner for a vehicle in a case where the controller 50 has received the heating mode from the vehicle occupant or the like (that is, at the time of heating) will be described.

When the controller 50 receives the heating mode from the vehicle occupant or the like, the controller 50 gives a command to enter the heating state to the three-way valve 25, and gives an open command to the two-way valve 26. The controller 50 gives a closing command to the first expansion valve 22, and gives an opening degree command indicating an opening degree according to the state quantity of the refrigerant detected by the expansion valve control detector 30 to the second expansion valve 23. The controller 50 gives a drive command to the blower 12 of the HVAC unit 10. The controller 50 gives a damper opening degree command to make the amount of air passing through the inner condenser 14, of the air that has flowed into the unit duct 11, larger than the amount of air bypassing the inner condenser 14 without passing through it, of the air that has flowed into the unit duct 11, to the air mix damper 15 of the HVAC unit 10. Further, the controller 50 also gives a drive command to the compressor 20.

Figure 2:
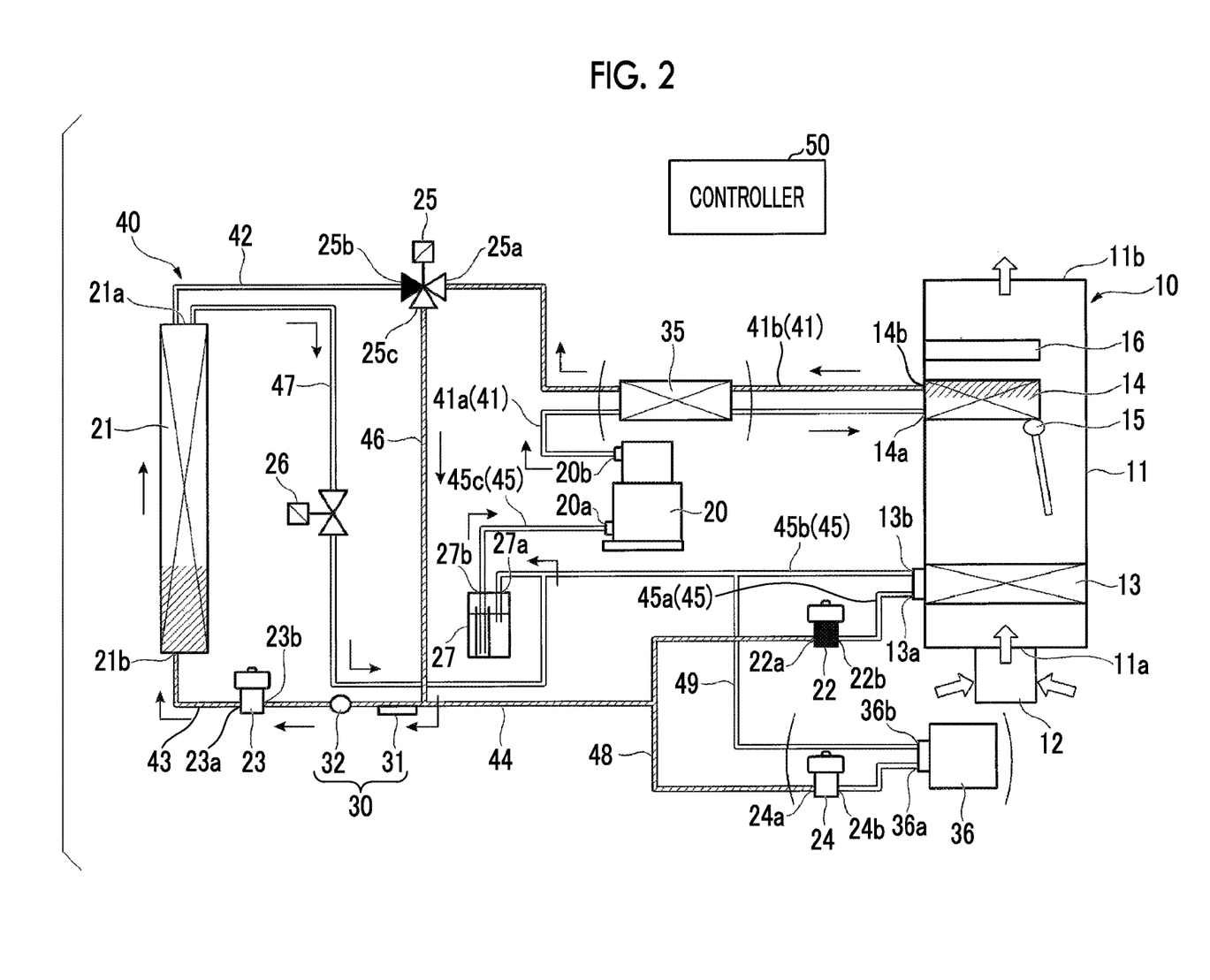
FIG. 2 is a system diagram showing a configuration of the air conditioner for a vehicle according to an embodiment of the present disclosure, and shows a flow of a refrigerant during heating.

As a result, as shown in FIG. 2, the three-way valve 25 enters the heating state, and the inlet 25a and the second outlet 25c of the three-way valve 25 enter a communication state. The two-way valve 26 enters an open state. The first expansion valve 22 enters a closed state. The blower 12 of the HVAC unit 10 begins to drive. The opening degree of the air mix damper 15 becomes an opening degree in which the amount of air passing through the inner condenser 14, of the air that has flowed into the unit duct 11, becomes larger than the amount of air bypassing the inner condenser 14 without passing through it, of the air that has flowed into the unit duct 11. The compressor 20 begins to drive and rotate.

When the air conditioner for a vehicle enters the above state, the gas-phase refrigerant compressed by the compressor 20 flows into the inner condenser 14 via the first discharge line 41a. The air sent into the unit duct 11 by the blower 12 of the HVAC unit 10 passes through the inner condenser 14. In the inner condenser 14, the heat exchange between the gas-phase refrigerant and the air is performed, so that the refrigerant is cooled and condensed and the air is heated. The heated air flows into the occupant space in the vehicle from the unit duct 11 through the vent provided in the instrument panel or the like.

The refrigerant condensed in the inner condenser 14, that is, the liquid-phase refrigerant, flows into the three-way valve 25 from the inlet 25a of the three-way valve 25 via the second discharge line 41b. In FIG. 2, in the refrigerant line 40, a hatched portion is a portion where the liquid-phase refrigerant is present. In the three-way valve 25, in the heating state, the inlet 25a and the second outlet 25c are in the communication state, and therefore, the liquid-phase refrigerant flowing into the three-way valve 25 flows into the outer heat exchanger 21 from the second port 21b of the outer heat exchanger 21 via the first heating dedicated line 46, a part of the inter-expansion valve line 44, and the second expansion valve 23. The liquid-phase refrigerant is decompressed and expanded in the process of passing through the second expansion valve 23, and a part of the liquid-phase refrigerant becomes a gas phase. In the outer heat exchanger 21, the heat exchange between the outside air and the refrigerant is performed, so that the refrigerant is heated and evaporated and the outside air is cooled. That is, during the heating, the outer heat exchanger 21 functions as an evaporator.

The evaporated refrigerant, that is, the gas-phase refrigerant, flows out from the first port 21a of the outer heat exchanger 21. The gas-phase refrigerant flows into the compressor 20 via the second heating dedicated line 47, a part of the second suction line 45b, the buffer tank 27, and the third suction line 45c.

The gas-phase refrigerant is compressed by the compressor 20 and then flows into the inner condenser 14 via the first discharge line 41a, as described above.

The relationship between the rotation speed of the compressor 20 and a threshold value regarding a sub-cool degree is stored in the controller 50. The sub-cool degree is a deviation between the saturation temperature of the refrigerant and the actual temperature of the refrigerant. The relationship stored in the controller 50 is a relationship in which the threshold value increases as the rotation speed of the compressor 20 increases. The controller 50 uses this relationship to determine a threshold value according to the current rotation speed of the compressor 20. As described above, the threshold value varies according to the rotation speed of the compressor 20. However, the threshold value is in a range of 5 to 20° C., and preferably in a range of 5 to 15° C.

The pressure of the liquid-phase refrigerant detected by the pressure sensor 32 is input to the controller 50. The controller 50 obtains the saturation temperature of the refrigerant, based on this pressure. Further, the controller 50 obtains a sub-cool degree which is a deviation between the saturation temperature and the temperature of the liquid-phase refrigerant detected by the temperature sensor 31. The controller 50 compares the sub-cool degree with the threshold value, and in a case where the sub-cool degree is larger than the threshold value, the controller 50 gives an opening degree command in a direction of making the opening degree larger than that at the present time to the second expansion valve 23. Further, in a case where the sub-cool degree is smaller than the threshold value, the controller 50 gives an opening degree command in a direction of making the opening degree smaller than that at the present time to the second expansion valve 23.

The smaller the opening degree of the expansion valve is, the larger the amount of decompression and the amount of expansion of the refrigerant become. Therefore, the smaller the opening degree of the expansion valve is, the higher the cooling and heating capacity of the air conditioner for a vehicle becomes. However, the smaller the opening degree of the expansion valve is, the higher the pressure loss of the refrigerant in the refrigerant line 40 becomes, and the cooling and heating efficiency decreases. That is, the smaller the opening degree of the expansion valve is, the higher the cooling and heating capacity becomes, but the cooling and heating efficiency decreases. On the other hand, the larger the opening degree of the expansion valve is, the lower the cooling and heating capacity becomes, but the cooling and heating efficiency is improved.

Next, the operation of the air conditioner for a vehicle in a case where the controller 50 receives the cooling mode from the vehicle occupant or the like will be described.

When the controller 50 receives the cooling mode from the vehicle occupant or the like, the controller 50 gives a command to enter the cooling state to the three-way valve 25, and gives a closing command to the two-way valve 26. The controller 50 gives an open command to the second expansion valve 23 and gives an opening degree command indicating an opening degree according to the state quantity of the refrigerant detected by the expansion valve control detector 30 to the first expansion valve 22. The controller 50 gives a drive command to the blower 12 of the HVAC unit 10. The controller 50 gives a damper opening degree command to cause most of the air which has flowed into the unit duct 11 to bypass the inner condenser 14 without passing through it to the air mix damper 15 of the HVAC unit 10. Further, the controller 50 also gives a drive command to the compressor 20.

Figure 3:
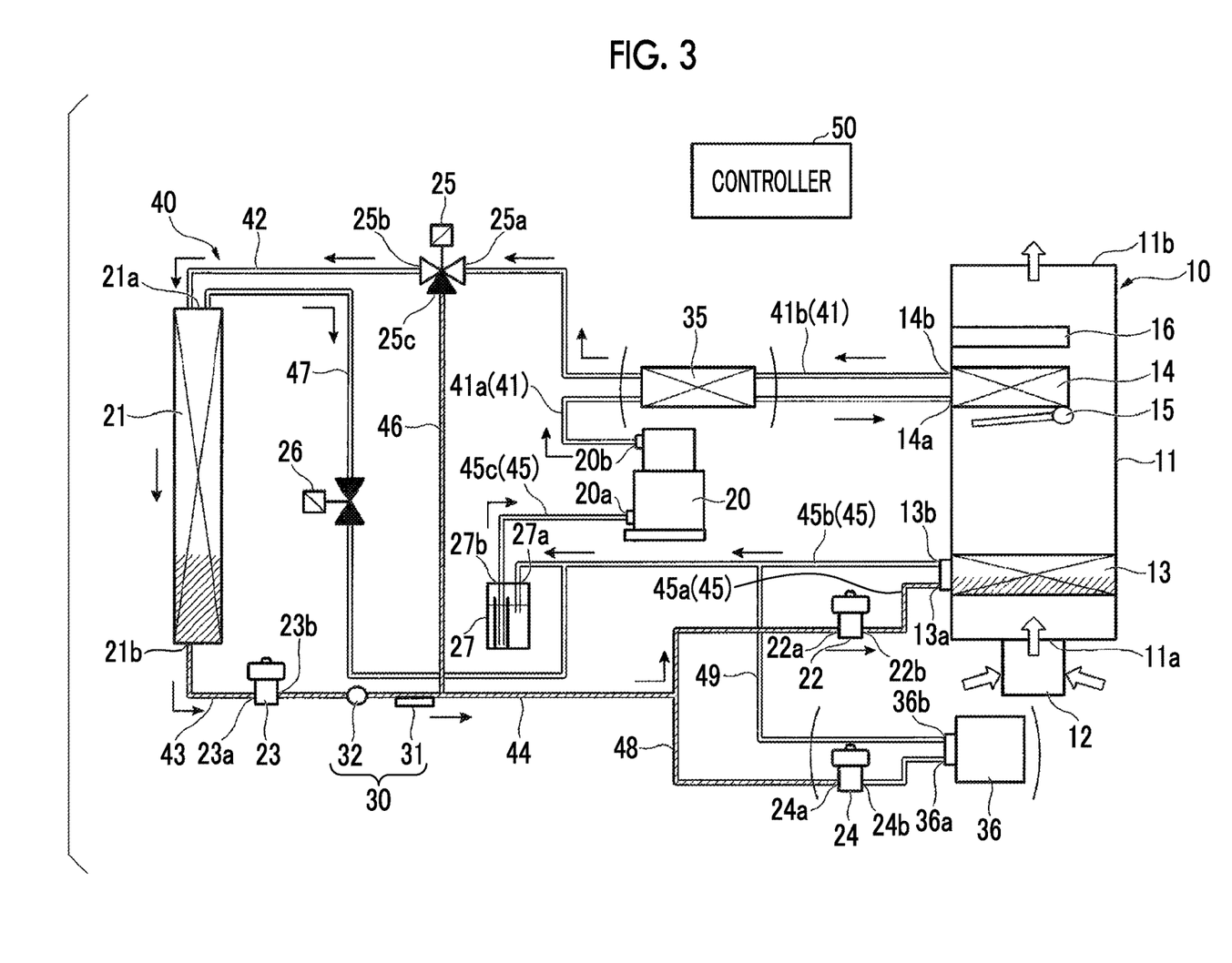
FIG. 3 is a system diagram showing a configuration of the air conditioner for a vehicle according to an embodiment of the present disclosure, and shows a flow of a refrigerant during cooling.

As a result, as shown in FIG. 3, the three-way valve 25 enters the cooling state, and the inlet 25*a* and the first outlet 25*b* of the three-way valve 25 enter the communication state. The two-way valve 26 enters the closed state. The second expansion valve 23 enters the open state. The blower 12 of the HVAC unit 10 begins to drive. The opening degree of the air mix damper 15 becomes an opening degree in which most of the air which has flowed into the unit duct 11 bypasses the inner condenser 14 without passing through it. The compressor 20 begins to drive and rotate.

When the air conditioner for a vehicle enters the above state, the gas-phase refrigerant compressed by the compressor 20 flows into the inner condenser 14 via the first discharge line 41*a*. Due to the presence of the air mix damper 15 of the HVAC unit 10, the air sent into the unit duct 11 by the blower 12 hardly passes through the inner condenser 14. Therefore, in the inner condenser 14, the amount of heat exchange between the gas-phase refrigerant and the air becomes small, the refrigerant is hardly condensed, and the air is hardly heated. Accordingly, the gas-phase refrigerant that has flowed into the inner condenser 14 flows out from the inner condenser 14 as it is.

The gas-phase refrigerant flowing out from the inner condenser 14 flows into the three-way valve 25 from the inlet 25*a* of the three-way valve 25 via the second discharge line 41*b*. In the three-way valve 25, in the cooling state, the inlet 25*a* and the first outlet 25*b* are in the communication state, and therefore, the gas-phase refrigerant which has flowed into the three-way valve 25 flows into the outer heat exchanger 21 from the first port 21*a* of the outer heat exchanger 21 via the heat exchanger first port line 42. In the outer heat exchanger 21, the heat exchange between the outside air and the gas-phase refrigerant is performed, so that the refrigerant is cooled and condensed and the outside air is heated. That is, during the cooling, the outer heat exchanger 21 functions as a condenser.

The condensed refrigerant, that is, the liquid-phase refrigerant, flows out from the second port 21*b* of the outer heat exchanger 21. In FIG. 3, in the refrigerant line 40, the hatched portion is a portion where the liquid-phase refrigerant is present. The liquid-phase refrigerant flows into the first expansion valve 22 via the heat exchanger second port line 43, the second expansion valve 23 in the open state, and the inter-expansion valve line 44. The liquid-phase refrigerant is decompressed and expanded in the process of passing through the first expansion valve 22, and a part of the liquid-phase refrigerant becomes a gas phase. This refrigerant flows into the evaporator 13 via the first suction line 45*a*.

In the evaporator 13, the heat exchange between the air sent into the unit duct 11 by the blower 12 of the HVAC unit 10 and the liquid-phase refrigerant is performed, so that the refrigerant is heated and evaporated and the air is cooled. Most of the cooled air bypasses the inner condenser 14 without passing through it due to the presence of the air mix damper 15, and flows out from the unit duct 11. Then, the cooled air flows into the occupant space in the vehicle through the vent provided in the instrument panel or the like.

The refrigerant evaporated in the evaporator 13, that is, the gas-phase refrigerant, flows into the compressor 20 from the evaporator 13 via the second suction line 45*b*, the buffer tank 27, and the third suction line 45*c*.

The gas-phase refrigerant is compressed by the compressor 20 and then flows into the inner condenser 14 via the first discharge line 41*a*, as described above.

The pressure of the liquid-phase refrigerant detected by the pressure sensor 32 is input to the controller 50, as in the heating mode. The controller 50 obtains the saturation temperature of the refrigerant, based on this pressure. Further, the controller 50 obtains a sub-cool degree which is a deviation between the saturation temperature and the temperature of the liquid-phase refrigerant detected by the temperature sensor 31. The controller 50 compares the sub-cool degree with the threshold value, and in a case where the sub-cool degree is larger than the threshold value, the controller 50 gives an opening degree command in a direction of making the opening degree larger than that at the present time to the first expansion valve 22. Further, in a case where the sub-cool degree is smaller than the threshold value, the controller 50 gives an opening degree command in a direction of making the opening degree smaller than that at the present time to the first expansion valve 22.

(Configuration of Outer Heat Exchanger)

Next, the configuration of the outer heat exchanger 21 will be described in detail with reference to FIGS. 4 and 5. As described above, in the outer heat exchanger 21, the flow directions of the refrigerant flowing in and out through the first port 21*a* and the second port 21*b* are different from each other between the heating mode and the cooling mode. In the following, after the configuration of the outer heat exchanger 21 is described, the flow of the refrigerant in each of the heating mode and the cooling mode will be described individually.

Figure 4:
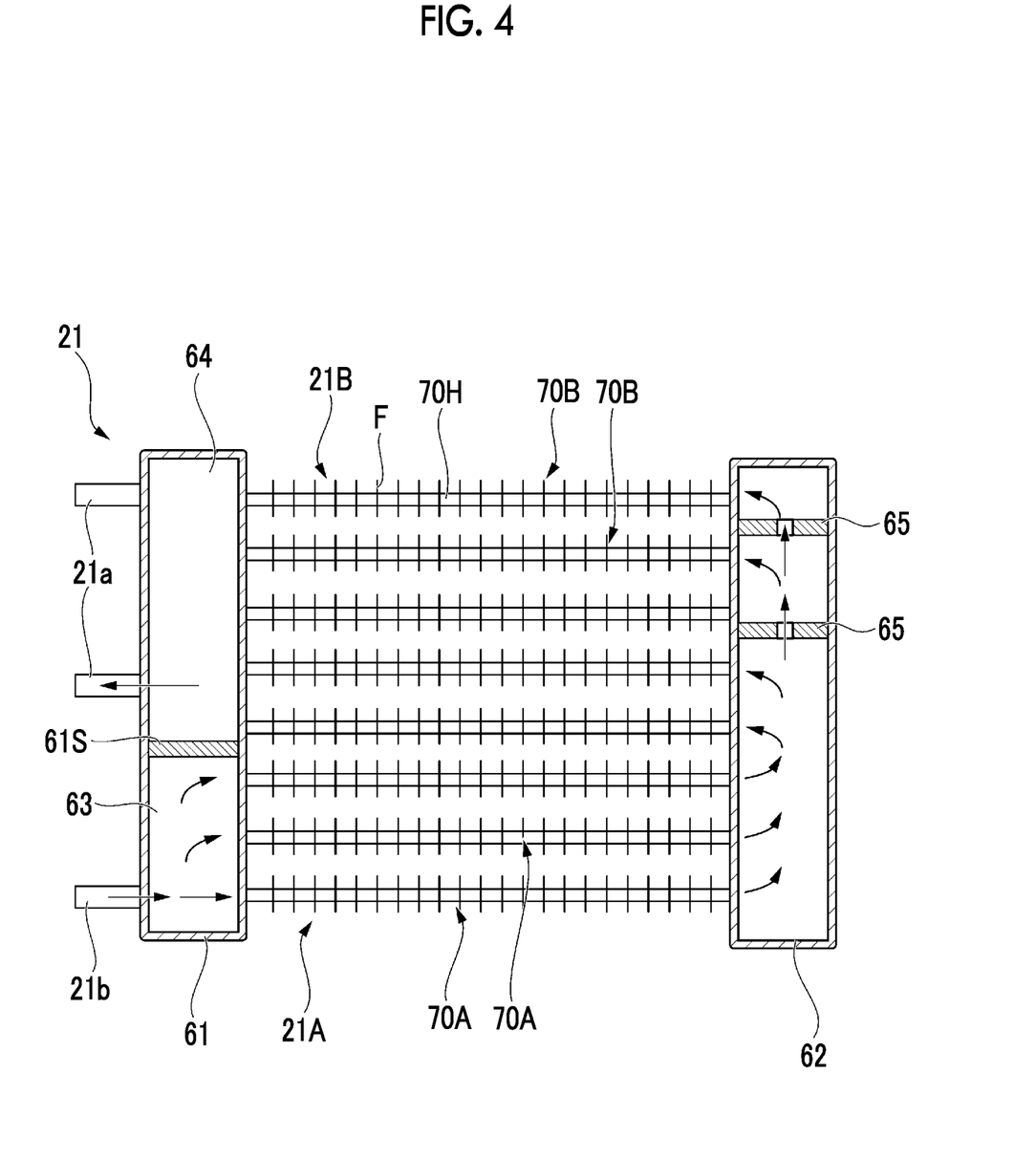
FIG. 4 is a sectional view showing a configuration of an outer heat exchanger (a heat exchanger) according to an embodiment of the present disclosure, and shows a flow of a refrigerant during heating.

As shown in FIG. 4, the outer heat exchanger 21 includes a first header pipe 61, a partition plate 61S, a first heat transfer pipe 70A, a second heat transfer pipe 70B, a second header pipe 62 (a header pipe), and a flow velocity adjustment part 65.

(Configuration of First Header Pipe)

The first header pipe 61 is a bottomed tubular member that extends in an up-down direction, and in the middle of an extending direction, the first port 21a and the second port 21b described above are disposed with an interval therebetween in the up-down direction. More specifically, one second port 21b is formed in a lower portion of the first header pipe 61, and two first ports 21a are formed in an upper portion of the first header pipe 61. Further, the partition plate 61S having a disk shape is disposed in the interior of the first header pipe 61. The partition plate 61S divides the interior of the first header pipe 61 into two spaces. The space below the partition plate 61S serves as a first inlet/outlet part 63 with which the second port 21b communicates. The space above the partition plate 61S serves as a second inlet/outlet part 64 with which the two first ports 21a communicate. The dimension of the second inlet/outlet part 64 in the up-down direction is larger than the dimension of the first inlet/outlet part 63. The term "up-down direction" referred to herein refers to a substantial up-down direction, and design tolerances or manufacturing errors are allowed.

(Compositions of First Heat Transfer Pipe and Second Heat Transfer Pipe)

One end side of each of a plurality of first heat transfer pipes 70A and a plurality of second heat transfer pipes 70B is connected to the first header pipe 61. More specifically, one end of each of the plurality of (in the example of FIGS. 4 and 5, three) first heat transfer pipes 70A is connected to the first inlet/outlet part 63 of the first header pipe 61. One end of each of the plurality of (in the example of FIGS. 4 and 5, five) second heat transfer pipes 70B is connected to the second inlet/outlet part 64 of the first header pipe 61. That is, the number of second heat transfer pipes 70B is greater than the number of first heat transfer pipes 70A. The numbers and ratios of heat transfer pipes shown in FIGS. 4 and 5 are examples, and can be changed according to design and specifications.

The first heat transfer pipe 70A and the second heat transfer pipe 70B have the same configuration. Specifically, each of the first heat transfer pipe 70A and the second heat transfer pipe 70B includes a tubular pipe main body 70H in which the refrigerant flows, and a plurality of fins F provided on an outer peripheral surface of the pipe main body 70H. The pipe main body 70H extends in a horizontal direction from a side surface of the first header pipe 61. Each fin F has an annular shape extending in a circumferential direction on the outer peripheral surface of the pipe main body 70H. A plurality of fins F as described above are arranged at intervals in the extending direction of the pipe main body 70H. The term "horizontal direction" referred to herein refers to a substantially horizontal direction, and design tolerances or manufacturing errors are allowed.

The first inlet/outlet part 63 and the plurality of first heat transfer pipes 70A configure a first heat exchange unit 21A. Further, the second inlet/outlet part 64 and the plurality of second heat transfer pipes 70B configure a second heat exchange unit 21B. As described above, since the number of the second heat transfer pipes 70B is greater than the number of the first heat transfer pipes 70A, the heat exchange area of the second heat exchange unit 21B (that is, the area available for the heat exchange between the refrigerant and the air) is larger than the heat exchange area of the first heat exchange unit 21A. This is because in the second heat exchange unit 21B, the proportion of the gas-phase component in the gas-liquid two-phase refrigerant is large, so that a pressure loss becomes large. On the other hand, in the first heat exchange unit 21A, the proportion of the liquid-phase component is large, so that a pressure loss is small.

Further, as described above, since the number of the second heat transfer pipes 70B is greater than the number of the first heat transfer pipes 70A, the sum of the flow path cross-sectional areas of the second heat transfer pipes 70B in the second heat exchange unit 21B is larger than the sum of the flow path cross-sectional areas of the first heat transfer pipes 70A in the first heat exchange unit 21A.

(Configuration of Second Header Pipe)

The second header pipe 62 is connected to the other end of the first heat transfer pipe 70A and to the other end of the second heat transfer pipe 70B. The second header pipe 62 is a bottomed tubular member extending in the up-down direction, similar to the first header pipe 61. A plurality of (as an example, two) disks as the flow velocity adjustment parts 65 are provided in the interior of the second header pipe 62. The flow velocity adjustment part 65 has an opening with a diameter smaller than the inner diameter of the second header pipe 62. The refrigerant can flow in the up-down direction through this opening. In particular, since the diameter of the opening is smaller than the inner diameter of the second header pipe 62, the flow velocity adjustment part 65 functions as a throttle (or a nozzle), so that the flow velocity of the refrigerant passing through the flow velocity adjustment part 65 increases compared to before the passage. That is, the refrigerant reaches farther compared to before passing through the flow velocity adjustment part 65. In the example of FIGS. 4 and 5, two flow velocity adjustment parts 65 are provided at positions biased toward an upper portion in the interior of the second header pipe 62.

(Operation of Outer Heat Exchanger in Heating Mode)

As shown in FIG. 4, in the heating mode, the refrigerant in a gas-liquid mixed phase state flows into the outer heat exchanger 21 from the second port 21b. The refrigerant flows into the first heat transfer pipe 70A through the first inlet/outlet part 63 of the first header pipe 61. On the way, the temperature of the refrigerant rises due to the heat exchange with the air, and eventually the refrigerant enters a gas-phase state. Thereafter, the refrigerant flows into the second heat transfer pipe 70B via the second header pipe 62. On the way, the temperature of the refrigerant further rises due to the heat exchange between the refrigerant and the air, and flows into the second inlet/outlet part 64 with a predetermined temperature and pressure. Thereafter, the refrigerant is extracted from one of the first ports 21a to the outside. In the present embodiment, as an example, the refrigerant is extracted only through the first port 21a on a lower side to the outside.

(Operation of Outer Heat Exchanger in Cooling Mode)

Figure 5:
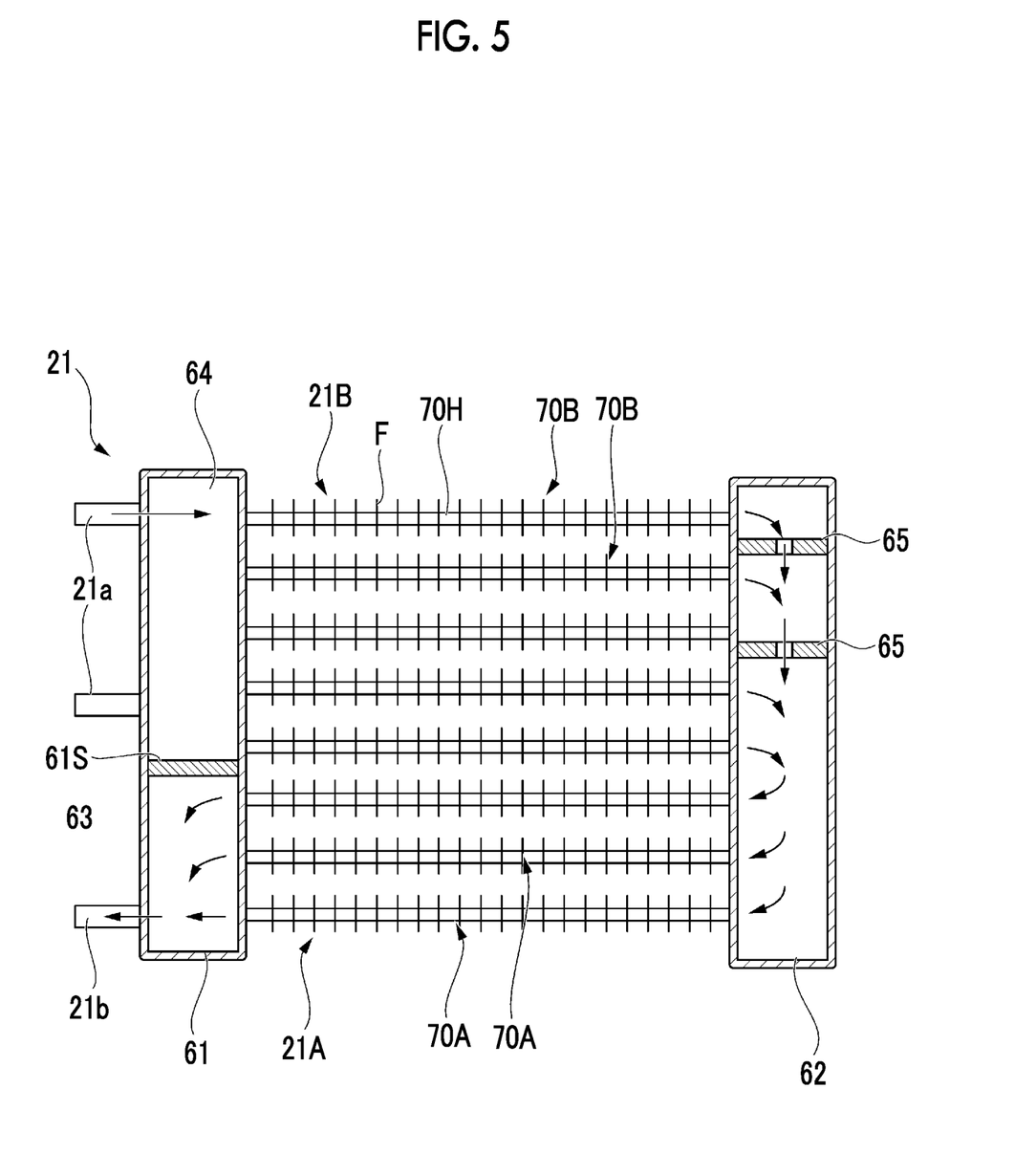
FIG. 5 is a sectional view showing a configuration of the outer heat exchanger (the heat exchanger) according to an embodiment of the present disclosure, and shows a flow of a refrigerant during cooling.

As shown in FIG. 5, in the cooling mode, the refrigerant in a gas-phase state flows into the outer heat exchanger 21 from one of the first ports 21a. In the present embodiment, as an example, the refrigerant flows into the outer heat exchanger 21 only from the first port 21a on an upper side. The refrigerant flows into the second heat transfer pipe 70B through the second inlet/outlet part 64 of the first header pipe 61. On the way, the temperature of the refrigerant decreases due to the heat exchange between the refrigerant and the air, and eventually the refrigerant enters a gas-liquid mixed phase state. Thereafter, the refrigerant flows into the first heat transfer pipe 70A via the second header pipe 62. On the way, the temperature of the refrigerant further decreases, and flows into the first inlet/outlet part 63 with a predetermined temperature and pressure. Thereafter, the refrigerant is extracted from the second port 21b to the outside.

(Operation and Effects)

Here, during heating, in the interior of the heat exchanger, the refrigerant flows in a gas-liquid mixed phase state on the inlet side and flows in a gas phase state on the outlet side. That is, the heat exchange between the refrigerant and the air mainly proceeds on the outlet side. Therefore, during heating, it is important to secure a large heat exchange area on the outlet side. In the above configuration, during heating, the first heat exchange unit 21A becomes the inlet side, and the second heat exchange unit 21B becomes the outlet side. In the second heat exchange unit 21B, the heat exchange area, which is an area available for the heat exchange between the refrigerant and the air, is larger than that in the first heat exchange unit 21A. In this way, the heat exchange can proceed predominantly in the second heat exchange unit 21B that is the outlet side. On the other hand, during cooling, in the interior of the heat exchanger, the refrigerant flows in a gas-phase state on the inlet side, and flows in a gas-liquid mixed phase state on the outlet side. That is, the heat exchange between the refrigerant and the air proceeds mainly on the inlet side. Therefore, during cooling, it is important to secure a large heat exchange area on the inlet side. In the above configuration, during cooling, the second heat exchange unit 21B becomes the inlet side, and the first heat exchange unit 21A becomes the outlet side. In the second heat exchange unit 21B, the heat exchange area, which is an area available for the heat exchange between the refrigerant and the air, is larger than that in the first heat exchange unit 21A. In this way, the heat exchange can proceed predominantly in the second heat exchange unit 21B that is the inlet side. In this manner, according to the above configuration, it is possible to realize optimum heat exchange area distribution according to the state of each refrigerant during cooling and during heating. As a result, the performance of the heat exchanger can be maximized regardless of whether it is in the cooling mode or the heating mode.

Further, during heating, in the interior of the heat exchanger, the refrigerant flows in a gas-liquid mixed phase state on the inlet side and flows in a gas phase state on the outlet side. That is, the heat exchange between the refrigerant and the air mainly proceeds on the outlet side. Therefore, during heating, it is important to make the refrigerant easily flow on the outlet side (that is, to keep a pressure loss small). In the above configuration, during heating, the first heat exchange unit 21A becomes the inlet side, and the second heat exchange unit 21B becomes the outlet side. In the second heat exchange unit 21B, the sum of the flow path cross-sectional areas is larger than that in the first heat exchange unit 21A. In this way, for example, the heat exchange can proceed predominantly in the second heat exchange unit 21B, which is the outlet side, of the first heat exchange unit 21A and the second heat exchange unit 21B, compared to a case where the flow path cross-sectional area is equal in the first heat exchange unit 21A and in the second heat exchange unit 21B. On the other hand, during cooling, in the interior of the heat exchanger, the refrigerant flows in a gas-phase state on the inlet side, and flows in a liquid state on the outlet side. That is, the heat exchange between the refrigerant and the air proceeds mainly on the inlet side. Therefore, during cooling, it is important to make the refrigerant easily flow on the inlet side (that is, to make a pressure loss small). In the above configuration, during cooling, the second heat exchange unit 21B becomes the inlet side, and the first heat exchange unit 21A becomes the outlet side. In the second heat exchange unit 21B, the sum of the flow path cross-sectional areas is larger than that in the first heat exchange unit 21A. In this way, for example, the heat exchange can proceed predominantly in the second heat exchange unit 21B, which is the inlet side, of the first heat exchange unit 21A and the second heat exchange unit 21B, compared to a case where the flow path cross-sectional area is equal in the first heat exchange unit 21A and in the second heat exchange unit 21B. In this manner, according to the above configuration, it is possible to realize an optimum flow-ability (pressure loss) distribution according to the state of each refrigerant during cooling and during heating. As a result, the performance of the heat exchanger can be maximized regardless of whether it is in the cooling mode or the heating mode.

Further, according to the above configuration, the first heat transfer pipe 70A and the second heat transfer pipe 70B extend in the horizontal direction and are arranged in the up-down direction. In this way, for example, compared to a case where these heat transfer pipes extend in the up-down direction, a probability that the refrigerant becomes uneven in the interior of the heat transfer pipe can be reduced. As a result, the heat exchange efficiency can be further enhanced.

In addition, according to the above configuration, only by making the number of the second heat transfer pipes 70B greater than the number of the first heat transfer pipes 70A, it is possible to easily make the heat exchange area of the second heat exchange unit 21B relatively large and to make a pressure loss relatively small.

Further, according to the above configuration, the flow velocity adjustment part 65 is provided in the interior of the header pipe. The opening of the flow velocity adjustment part 65 is smaller than the inner diameter of the header pipe. In this way, when the refrigerant passes through the opening, the flow velocity of the refrigerant increases, so that a jet flow is formed. As a result, it is possible to cause the refrigerant to sufficiently reach the downstream side in the interior of the header pipe, and the refrigerant can be more uniformly distributed in the interior of the heat exchanger.

OTHER EMBODIMENTS

The embodiment of the present disclosure has been described in detail above with reference to the drawings. However, the specific configurations are not limited to this embodiment and also include design changes and the like within a scope which does not depart from the gist of the present disclosure.

As depicted in parentheses in FIG. 1, an auxiliary heat exchanger 35 that heats the refrigerant in the discharge line 41 may be provided.

As depicted in parentheses in FIG. 1, a battery cooler 36 may be provided to cool a battery (not shown) provided in the vehicle. In this case, for example, the refrigerant flowing through the refrigerant line 40 is used as a refrigerant for the battery cooler 36. The battery cooler 36 has an inlet 36a through which the refrigerant flows in, and an outlet 36b through which the refrigerant flows out. The inlet 36a of the battery cooler 36 and the inter-expansion valve line 44 are connected by a cooler inlet line 48. The outlet 36b of the battery cooler 36 and the second suction line 45b are connected by a cooler outlet line 49. The cooler inlet line 48 and the cooler outlet line 49 configure a part of the refrigerant line 40. A third expansion valve 24 is provided in the cooler inlet line 48. The third expansion valve 24 has a valve case, a valve body disposed in the valve case, and an electromagnetic drive mechanism that moves the valve body in the valve case to change a valve opening degree, similar to the first expansion valve 22 and the second expansion valve 23. The valve case has a first port 24*a* and a second port 24*b* through which the refrigerant enters and exits. The battery cooler 36 and the third expansion valve 24 are controlled by the controller 50.

<Additional Remark>

The heat exchanger (the outer heat exchanger 21) and the air conditioner for a vehicle described in each embodiment are understood as follows, for example.

(1) A heat exchanger according to a first aspect includes: the first heat exchange unit 21A that includes the first inlet/outlet part 63 which has one inlet/outlet port and through which a refrigerant flows, and the plurality of first heat transfer pipes 70A, each of which has one end connected to the first inlet/outlet part 63; a header pipe (the second header pipe 62) connected to the other ends of the plurality of first heat transfer pipes 70A; and the second heat exchange unit 21B that includes the second inlet/outlet part 64 which has two or more inlet/outlet ports and through which a refrigerant flows, and the plurality of second heat transfer pipes 70B, each of which has one end connected to the header pipe and the other end connected to the second inlet/outlet part 64, in which the refrigerant flows from the first heat exchange unit 21A side toward the second heat exchange unit 21B side during heating, the refrigerant flows from the second heat exchange unit 21B side toward the first heat exchange unit 21A side during cooling, and a heat exchange area, which is an area available for heat exchange between the refrigerant and air, is larger in the second heat exchange unit 21B than in the first heat exchange unit 21A.

Here, during heating, in the interior of the heat exchanger, the refrigerant flows in a gas-liquid mixed phase state on the inlet side and flows in a gas phase state on the outlet side. That is, the heat exchange between the refrigerant and the air mainly proceeds on the outlet side. Therefore, during heating, it is important to secure a large heat exchange area on the outlet side. In the above configuration, during heating, the first heat exchange unit 21A becomes the inlet side, and the second heat exchange unit 21B becomes the outlet side. In the second heat exchange unit 21B, the heat exchange area, which is an area available for the heat exchange between the refrigerant and the air, is larger than that in the first heat exchange unit 21A. In this way, the heat exchange can proceed predominantly in the second heat exchange unit 21B that is the outlet side. On the other hand, during cooling, in the interior of the heat exchanger, the refrigerant flows in a gas-phase state on the inlet side, and flows in a gas-liquid mixed phase state on the outlet side. That is, the heat exchange between the refrigerant and the air proceeds mainly on the inlet side. Therefore, during cooling, it is important to secure a large heat exchange area on the inlet side. In the above configuration, during cooling, the second heat exchange unit 21B becomes the inlet side, and the first heat exchange unit 21A becomes the outlet side. In the second heat exchange unit 21B, the heat exchange area, which is an area available for the heat exchange between the refrigerant and the air, is larger than that in the first heat exchange unit 21A. In this way, the heat exchange can proceed predominantly in the second heat exchange unit 21B that is the inlet side. In this manner, according to the above configuration, it is possible to realize optimum heat exchange area distribution according to the state of each refrigerant during cooling and during heating. As a result, the performance of the heat exchanger can be maximized regardless of whether it is during cooling or during heating.

(2) A heat exchanger according to a second aspect includes: the first heat exchange unit 21A that includes the first inlet/outlet part 63 which has one inlet/outlet port and through which a refrigerant flows, and the plurality of first heat transfer pipes 70A, each of which has one end connected to the first inlet/outlet part 63; a header pipe (the second header pipe 62) connected to the other ends of the plurality of first heat transfer pipes 70A; and the second heat exchange unit 21B that includes the second inlet/outlet part 64 which has two or more inlet/outlet ports and through which a refrigerant flows, and the plurality of second heat transfer pipes 70B, each of which has one end connected to the header pipe and the other end connected to the second inlet/outlet part 64, in which the refrigerant flows from the first heat exchange unit 21A side toward the second heat exchange unit 21B side during heating, the refrigerant flows from the second heat exchange unit 21B side toward the first heat exchange unit 21A side during cooling, and the sum of flow path cross-sectional areas of the second heat transfer pipes 70B in the second heat exchange unit 21B is larger than the sum of flow path cross-sectional areas of the first heat exchange pipes 70A in the first heat exchange unit 21A.

Here, during heating, in the interior of the heat exchanger, the refrigerant flows in a gas-liquid mixed phase state on the inlet side and flows in a gas phase state on the outlet side. That is, the heat exchange between the refrigerant and the air mainly proceeds on the outlet side. Therefore, during heating, it is important to make the refrigerant easily flow on the outlet side (that is, to keep a pressure loss small). In the above configuration, during heating, the first heat exchange unit 21A becomes the inlet side, and the second heat exchange unit 21B becomes the outlet side. In the second heat exchange unit 21B, the sum of the flow path cross-sectional areas is larger than that in the first heat exchange unit 21A. In this way, the heat exchange can proceed predominantly in the second heat exchange unit 21B that is the outlet side. On the other hand, during cooling, in the interior of the heat exchanger, the refrigerant flows in a gas-phase state on the inlet side, and flows in a gas-liquid mixed phase state on the outlet side. That is, the heat exchange between the refrigerant and the air proceeds mainly on the inlet side. Therefore, during cooling, it is important to make the refrigerant easily flow on the inlet side (that is, to make a pressure loss small). In the above configuration, during cooling, the second heat exchange unit 21B becomes the inlet side, and the first heat exchange unit 21A becomes the outlet side. In the second heat exchange unit 21B, the sum of the flow path cross-sectional areas is larger than that in the first heat exchange unit 21A. In this way, the heat exchange can proceed predominantly in the second heat exchange unit 21B that is the inlet side. In this manner, according to the above configuration, it is possible to realize an optimum flow-ability (pressure loss) distribution according to the state of each refrigerant during cooling and during heating. As a result, the performance of the heat exchanger can be maximized regardless of whether it is during cooling or during heating.

(3) In a heat exchanger according to a third aspect, the plurality of first heat transfer pipes 70A and the plurality of second heat transfer pipes 70B extend in the horizontal direction and are arranged at intervals in the up-down direction, and the first inlet/outlet part 63 is disposed below the second inlet/outlet part 64.

According to the above configuration, the first heat transfer pipe 70A and the second heat transfer pipe 70B extend in the horizontal direction and are arranged in the up-down direction. In this way, for example, compared to a case where these heat transfer pipes extend in the up-down direction, a probability that the refrigerant becomes uneven in the interior of the heat transfer pipe can be reduced. As a result, the heat exchange efficiency can be further enhanced.

(4) In a heat exchanger according to a fourth aspect, the number of the second heat transfer pipes 70B is greater than the number of the first heat transfer pipes 70A.

According to the above configuration, only by making the number of the second heat transfer pipes 70B greater than the number of the first heat transfer pipes 70A, it is possible to easily make the heat exchange area of the second heat exchange unit 21B relatively large and to keep a pressure loss small.

(5) A heat exchanger according to a fifth aspect further includes the flow velocity adjustment part 65 provided in the interior of the header pipe (the second header pipe 62) and having an opening with a diameter smaller than an inner diameter of the header pipe.

According to the above configuration, the flow velocity adjustment part 65 is provided in the interior of the header pipe. The opening of the flow velocity adjustment part 65 is smaller than the inner diameter of the header pipe. In this way, when the refrigerant passes through the opening, the flow velocity of the refrigerant increases, so that a jet flow is formed. As a result, it is possible to cause the refrigerant to sufficiently reach the downstream side in the interior of the header pipe, and the refrigerant can be more uniformly distributed in the interior of the heat exchanger.

(6) An air conditioner for a vehicle according to a sixth aspect includes the heat exchanger according to any one of the above aspects.

According to the above configuration, since the heat exchanger having higher heat exchange efficiency is provided, the performance as an air conditioner for a vehicle can be further improved.

INDUSTRIAL APPLICABILITY

The present disclosure relates to a heat exchanger and an air conditioner for a vehicle. According to the present disclosure, it is possible to provide a heat exchanger and an air conditioner for a vehicle, in which the heat exchange efficiency is further improved regardless of the operating state.

REFERENCE SIGNS LIST

10: HVAC unit
11: Unit duct
11a: Air inlet
11b: Air outlet
12: Blower
13: Evaporator
13a: Inlet
13b: Outlet
14: Inner condenser
14a: Inlet
14b: Outlet
15: Air mix damper
16: Auxiliary heater
20: Compressor
20a: Suction port
20b: Discharge port
21: Outer heat exchanger (heat exchanger)
21a: First port (inlet/outlet port)
21b: Second port (inlet/outlet port)
21A: First heat exchange unit
21B: Second heat exchange unit
22: First expansion valve
22a: First port
22b: Second port
23: Second expansion valve
23a: First port
23b: Second port
24: Third expansion valve
24a: First port
24b: Second port
25: Three-way valve
25a: Inlet
25b: First outlet
25c: Second outlet
26: Two-way valve
27: Buffer tank
27a: Inlet
27b: Outlet
30: Expansion valve control detector
31: Temperature sensor
32: Pressure sensor
35: Auxiliary heat exchanger
36: Battery cooler
36a: Inlet
36b: Outlet
40: Refrigerant line
41: Discharge line
41a: First discharge line
41b: Second discharge line
42: Heat exchanger first port line
43: Heat exchanger second port line
44: Inter-expansion valve line
45: Suction line
45a: First suction line
45b: Second suction line
45c: Third suction line
46: First heating dedicated line
47: Second heating dedicated line
48: Cooler inlet line
49: Cooler outlet line
50: Controller
61: First header pipe
61S: Partition plate
62: Second header pipe (header pipe)
63: First inlet/outlet part
64: Second inlet/outlet part
65: Flow velocity adjustment part
70A: First heat transfer pipe
70B: Second heat transfer pipe
70H: Pipe main body
F: Fin

The invention claimed is:

1. A heat exchanger comprising:
a first heat exchange unit that includes a first inlet/outlet part which has one inlet/outlet port and through which a refrigerant flows, and a plurality of first heat transfer pipes, each of which has one end connected to the first inlet/outlet part;
a header pipe connected to the other ends of the plurality of first heat transfer pipes and extending in a gravity direction; and
a second heat exchange unit that includes a second inlet/outlet part which has two or more inlet/outlet ports and through which a refrigerant flows, and a plurality of second heat transfer pipes, each of which has one end connected to the header pipe and the other end connected to the second inlet/outlet part, wherein the refrigerant flows from a first heat exchange unit side toward a second heat exchange unit side during heating, the refrigerant flows from the second heat exchange unit side toward the first heat exchange unit side during cooling, a heat exchange area, which is an area available for heat exchange between the refrigerant and air, is larger in the second heat exchange unit than in the first heat exchange unit, the heat exchanger, further comprising: a plurality of flow velocity adjustment parts provided in an interior of the header pipe, each of the plurality of flow velocity adjustment parts has an opening with a diameter smaller than an inner diameter of the header pipe, and of an interval in the gravity direction between any two adjacent flow velocity adjustment parts of the plurality of flow velocity adjustment parts and an interval in the gravity direction between an uppermost flow velocity adjustment part of the plurality of flow velocity adjustment parts and an upper end of the header pipe, an upper interval is smaller than a lower interval.

2. The heat exchanger according to claim 1, wherein the plurality of first heat transfer pipes and the plurality of second heat transfer pipes extend in a horizontal direction and are arranged at intervals in the up-down direction, and the first inlet/outlet part is disposed below the second inlet/outlet part.

3. The heat exchanger according to claim 1, wherein the number of the second heat transfer pipes is greater than the number of the first heat transfer pipes.

4. An air conditioner for a vehicle comprising:
the heat exchanger according to claim 1.

5. A heat exchanger comprising:

a first heat exchange unit that includes a first inlet/outlet part which has one inlet/outlet port and through which a refrigerant flows, and a plurality of first heat transfer pipes, each of which has one end connected to the first inlet/outlet part;

a header pipe connected to the other ends of the plurality of first heat transfer pipes and extending in a gravity direction; and a second heat exchange unit that includes a second inlet/outlet part which has two or more inlet/outlet ports and through which a refrigerant flows, and a plurality of second heat transfer pipes, each of which has one end connected to the header pipe and the other end connected to the second inlet/outlet part, wherein the refrigerant flows from a first heat exchange unit side toward a second heat exchange unit side during heating, the refrigerant flows from the second heat exchange unit side toward the first heat exchange unit side during cooling, a sum of flow path cross-sectional areas of the second heat transfer pipes in the second heat exchange unit is larger than a sum of flow path cross-sectional areas of the first heat transfer pipes in the first heat exchange unit, the heat exchanger, further comprising: a plurality of flow velocity adjustment parts provided in an interior of the header pipe, each of the plurality of flow velocity adjustment parts has an opening with a diameter smaller than an inner diameter of the header pipe, and of an interval in the gravity direction between any two adjacent flow velocity adjustment parts of the plurality of flow velocity adjustment parts and an interval in the gravity direction between an uppermost flow velocity adjustment part of the plurality of flow velocity adjustment parts and an upper end of the header pipe, an upper interval is smaller than a lower interval.

6. The heat exchanger according to claim 5, wherein the plurality of first heat transfer pipes and the plurality of second heat transfer pipes extend in a horizontal direction and are arranged at intervals in the up-down direction, and the first inlet/outlet part is disposed below the second inlet/outlet part.

7. The heat exchanger according to claim 5, wherein the number of the second heat transfer pipes is greater than the number of the first heat transfer pipes.

8. An air conditioner for a vehicle comprising:
the heat exchanger according to claim 5.

* * * * *